Nov. 27, 1956  R. R. HUTCHISON  2,771,870
GASKET
Filed Sept. 29, 1954

INVENTOR
Robert R. Hutchison
BY L. D. Buch
ATTORNEY

United States Patent Office 2,771,870
Patented Nov. 27, 1956

2,771,870
GASKET

Robert R. Hutchison, Birmingham, Mich., assignor to General Motors Corporation, Detroit, Mich., a corporation of Delaware Application September 29, 1954, Serial No. 459,187

3 Claims. (Cl. 123—193)

The present invention relates to internal combustion engines and more particularly to gaskets therefor.

A gasket may be provided between two mating surfaces to insure a fluid proof seal that will prevent the leakage of fluid from between the surfaces. Although these gaskets are normally very effective in sealing the fluid, they occasionally fail and allow the fluid to leak from between the two surfaces. The loss of this fluid is, of course, very undesirable and should be prevented. Moreover, under some circumstances, the fluid that has escaped may cause serious trouble. This is particularly true where a single gasket is employed to provide a seal between two separate sets of fluid passages as a failure in such a gasket may allow the fluid in one of the sets of passages to enter and mix with the fluid in the other of the sets of passages. As an example, if the intake manifold gasket of an internal combustion engine should fail in or around the cooling system, it might allow coolant to enter the induction system, and thereby cause serious damage to the pistons and/or the cylinders.

It is now proposed to provide a leakage barrier in a gasket that may be compressed between mating surfaces on two members that have one or more sets of fluid passages that form registering apertures in the mating surfaces. The gasket may have openings therethrough that are positioned to register with these apertures to allow one passage in each set to communicate with the other passage in that set. The barrier may include one or more perforations in the gasket that are disposed between the openings. Thus when the gasket is compressed between the members, the perforations will cooperate with the mating surfaces to form a pocket therebetween which is in line with the apertures. Thus any fluid which escapes from one passage and flows toward the other passage will have to pass the barrier. However, the fluid will collect in the pocket and be prevented from passing the barrier.

Heretofore, where a single gasket seals the junction between two members that have a pair of separate passages, a failure in the gasket may permit the fluid in one passage escaping and entering the other passage without the fluid ever appearing on the exterior of the members. Thus such a leak may continue unobserved until serious damage occurs.

It is now proposed to provide a gasket for disposition between a pair of mating surfaces on two members that has a leakage barrier which will make any leakage of fluid readily apparent from the exterior of the members. This may be accomplished by providing a perforation in the gasket which is positioned to form a pocket that will collect any fluid that is leaking along the gasket and divert it to the exterior of the members.

Figure 1:
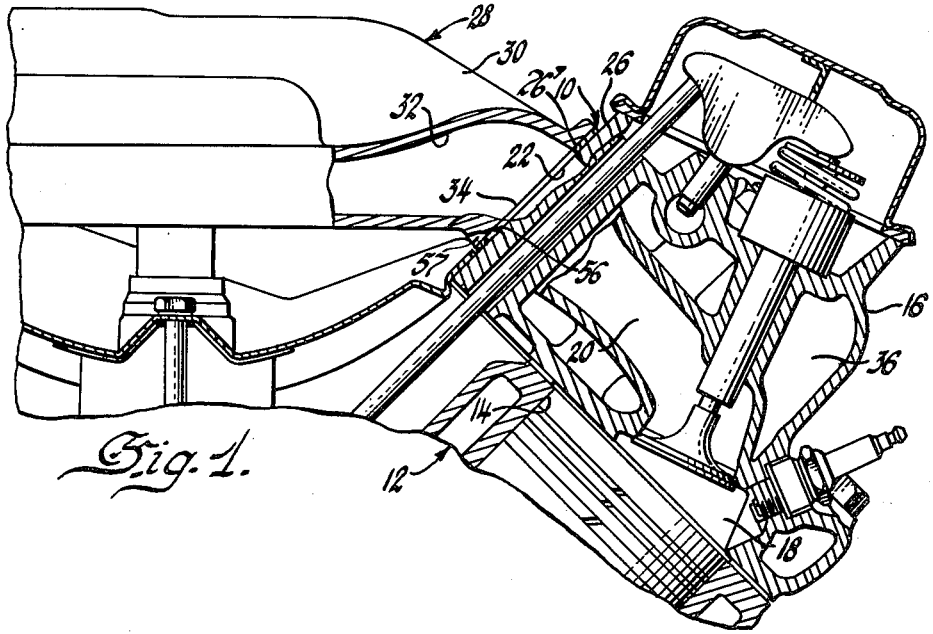
Fig. 1 is a view of an engine employing a gasket embodying the present invention.
Figure 2:
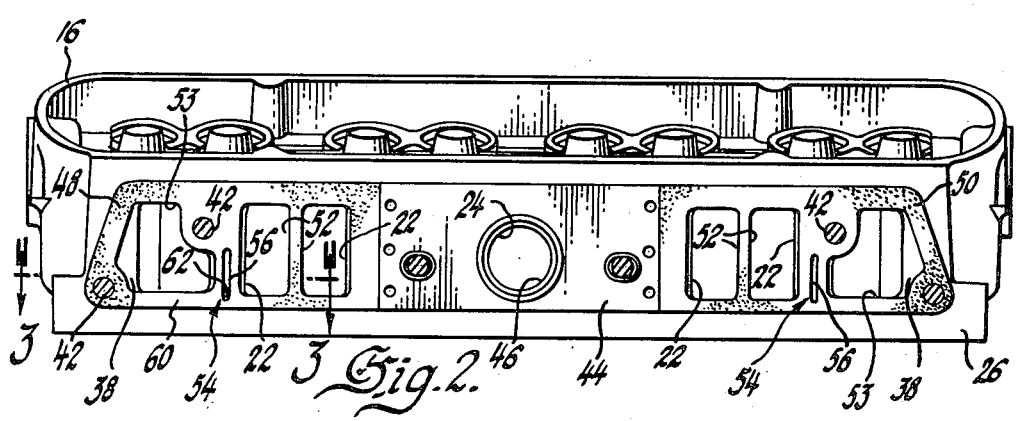
Fig. 2 is a side view of the cylinder head for the engine in Fig. 1.
Figure 3:
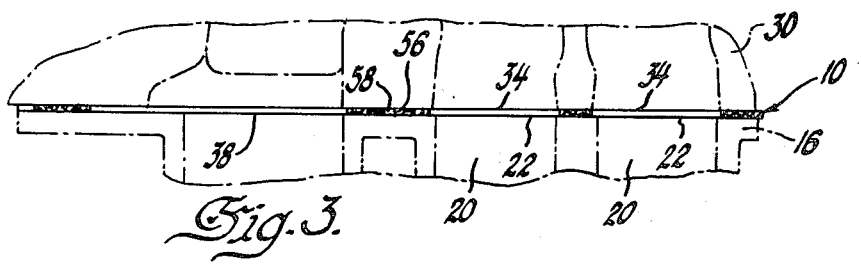
Fig. 3 is a cross sectional view of a gasket taken substantially along the plane of line 3—3 of Fig. 2.

Referring to the drawings in more detail, the present invention may be embodied in a gasket 10 for installation on any suitable engine 12. In the present instance the engine 12 is of the so-called "V-type" having a pair of angularly disposed banks of cylinders 14 with cylinder heads 16 secured thereto for closing the upper ends of the cylinders 14 and forming combustion chambers 18. Intake and exhaust passages 20 may be provided in the cylinder heads to communicate with the various combustion chambers 18 and form intake and exhaust ports 22 and 24 in the faces 26 of the heads 16.

An induction system 28 for charging the combustion chambers 18 may be provided between the two banks of cylinders 14. The present system 28 includes an intake manifold 30 that has distribution passages 32 extending therethrough to form outlets 34 positioned to register with the intake ports 22 in the heads 16. Thus if a carburetor is mounted on the manifold 30 to communicate with the distribution passages 32, the combustible charge may flow through the distribution passages 32, the outlets 34, the intake ports 22 and the intake passages 20 to the combustion chambers 18.

Coolant jackets 36 may be provided in the block and head 16 for passing a coolant in heat exchanging relation with the cylinders 14 and the combustion chambers 18. The jackets 36 in the cylinder heads 16 may form one or more coolant openings 38 in the faces 26 of the heads 16. In addition, passages may be provided in the manifold 30 that form apertures registering with the openings 38 in the faces 26 of the heads 16. The coolant passages in the manifold 30 may discharge the coolant into a radiator suitable for dissipating the heat in the coolant.

An exhaust crossover passage may be provided through the manifold 30 that will form apertures in the sides thereof which are positioned to register with the exhaust ports 24 in the faces 26 on the heads 16. This crossover passage is adjacent the distribution passages 32 so that the exhaust gases may be passed in heat exchanging relation with the charge in the distribution passages 32.

A gasket 10 may be provided between the mating faces 26 on the manifold 30 and the heads 16 so that when compressed, it will provide a fluid tight seal therebetween. The gasket 10 may include one or more bolt holes 42 to permit the manifold 30 being secured to the heads 16. A metallic center portion 44 may be disposed in and around the exhaust passages with an exhaust aperture 46 positioned to permit the exhaust gases to flow freely between the heads 16 and manifold 30 while the metallic portion 44 will prevent the leakage of these gases.

Readily compressible end portions 48 and 50 which are more effective for sealing purposes may extend from the metallic center portion 44 so as to seal the cooler induction and cooling passages. These end portions may include a plurality of elongated induction apertures 52 that are positioned symmetrically on the opposite sides of the exhaust aperture 46 to register with the intake and exhaust ports 22 and 24 and thereby allow the charge to flow freely from the distribution passages 32 to the intake passages 20.

In addition, cooling apertures 53 may be provided in the end portions 48 and 50 outboard of the induction apertures 52 and adjacent the ends of the gasket to register with the coolant openings 38. Thus the coolant will be free to flow from the cooling jacket 36 in the head 16 to the coolant passages in the manifold 30.

It may thus be seen that single gasket 10 has been provided which will effectively seal the junction between the exhaust passages, the induction passages and the cooling passages. Although this gasket will normally be effective to prevent leakage of fluids into or out of these passages, under some circumstances, it may fail and allow the fluid in one passage to escape and flow into another passage. Although any leakage would be an undesirable occurrence, in the event the gasket permitted the coolant to leak from the coolant passage to one of the induction passages, the coolant may enter the combustion chamber 18 and cause serious damage to the cylinders 14 and/or the pistons. Accordingly, a leakage barrier 54 may be provided between the induction apertures 52 and the coolant apertures 53 which will effectively prevent any serious damage occurring as a result of such leakage.

The barrier 54 may include one or more elongated perforations 56 in the end portions 48 and 50 which are disposed between the induction and coolant apertures 52 and 53. These perforations 56 will cooperate with the faces on the manifold 30 and heads 16 to form pockets 58 which are in substantial alignment with the induction and coolant apertures 52 and 53. A recess 57 may be provided in the face 26 of manifold 30 or in the head 16 to register with each of the perforations 56. In the event coolant escapes from the cooling system and leaks along the gasket 10 toward the induction aperture 52, the coolant must first pass the barrier 54 before it can enter the induction system. Thus the escaping coolant will flow into the pocket 58 and be collected there and thus be prevented from entering into the induction system.

As the leakage continues the fluid will collect in this pocket 58 and flow out through a recess 57 in the manifold 30. Thus the coolant may escape to the exterior of the engine by flowing into the pocket 58 and out of the recess 57. This will not only prevent the coolant entering the induction system but will also cause the coolant to appear on the exterior of the engine 12. Accordingly, the operator may readily observe the fact that the gasket 10 is defective and take appropriate action before serious trouble occurs. Heretofore, leaks of this nature have made no externally visible effects and as a result, they were not noticed until there was a considerable amount of damage done.

What is claimed is:

1. A gasket adapted to be compressed between a pair of mating surfaces on two separable members, each of said members including a pair of passages which form a pair of ports in the mating surface on that member, each of said ports being positioned to register with a corresponding port in the other of said members so that the corresponding passages in said members will form separate sets of passages, said gasket comprising a relatively thin member of sealing material having a first aperture positioned to register with one pair of registering ports and another aperture positioned to register with the other pair of registering ports, the adjacent portions of said aperture being separated from each other by a connecting portion of said thin member, an opening positioned in said connecting portion in substantial alignment with said adjacent portions of said apertures to form a continuous leakage barrier extending transversely between said adjacent portions for substantially the full width of said connecting portion.

2. A gasket adapted to be compressed between a pair of mating surfaces on two separable members, each of said members including a pair of passages which form ports in the mating surface on that member, the ports in one of said members being positioned to register with the corresponding ports in the other of said members so that the corresponding passages in said members will form separate sets of passages, said gasket comprising a relatively thin member of sealing material having a first aperture positioned to register with one set of registering ports and another aperture positioned to register with the other of said sets of ports, the adjacent edges of said apertures being separated by a connecting portion of said thin member for sealing one set of passages from the other set of passages and an opening disposed in said connecting portion in substantial alignment with the adjacent edges of said apertures, said opening being contained wholly within said member and terminating short of the sides thereof so that said sides of said member will be substantially continuous and free of any irregularities adjacent said barrier.

3. The combination of claim 2 wherein at least one portion of said opening is positioned to communicate with a recess in at least one of said separable members that opens into the atmosphere.

References Cited in the file of this patent

UNITED STATES PATENTS 1,768,995    Oven                 July 1, 1930

FOREIGN PATENTS 204,449    Great Britain           Oct. 4, 1923